United States Patent [19]
Naimpally

[11] Patent Number: 6,020,880
[45] Date of Patent: Feb. 1, 2000

[54] METHOD AND APPARATUS FOR PROVIDING ELECTRONIC PROGRAM GUIDE INFORMATION FROM A SINGLE ELECTRONIC PROGRAM GUIDE SERVER

[75] Inventor: Saiprasad V. Naimpally, Langhorne, Pa.

[73] Assignee: Matsushita Electric Industrial Co., Ltd., Osaka, Japan

[21] Appl. No.: 08/795,915

[22] Filed: Feb. 5, 1997

[51] Int. Cl.[7] .................................................. H04N 7/173
[52] U.S. Cl. ............................ 345/327; 348/10; 348/906
[58] Field of Search ........................... 345/327; 348/906, 348/7, 12, 13, 563, 564, 569, 570, 10; 455/4.2, 5.1, 6.2, 6.3; H04N 7/16, 7/173

[56] References Cited

U.S. PATENT DOCUMENTS

| | | |
|---|---|---|
| 4,740,912 | 4/1988 | Whitaker . |
| 4,751,578 | 6/1988 | Reiter et al. . |
| 4,812,843 | 3/1989 | Champion, III et al. . |
| 4,928,177 | 5/1990 | Martinez . |
| 4,989,174 | 1/1991 | Yasunobu et al. . |
| 5,027,400 | 6/1991 | Baji et al. . |
| 5,121,476 | 6/1992 | Yee . |
| 5,131,020 | 7/1992 | Liebesny et al. . |
| 5,168,353 | 12/1992 | Walker et al. . |
| 5,182,555 | 1/1993 | Sumner . |
| 5,327,498 | 7/1994 | Hamon . |
| 5,576,755 | 11/1996 | Davis et al. ................................ 348/12 |
| 5,585,838 | 12/1996 | Lawler et al. . |
| 5,589,892 | 12/1996 | Knee et al. . |
| 5,592,551 | 1/1997 | Lett et al. . |
| 5,657,072 | 8/1997 | Aristides et al. ......................... 348/906 |
| 5,684,525 | 11/1997 | Klosterman ................................ 348/12 |
| 5,808,694 | 9/1998 | Usui et al. ................................... 48/569 |

FOREIGN PATENT DOCUMENTS

| | | |
|---|---|---|
| 757 485 A2 | 2/1997 | European Pat. Off. . |
| 62-060378A | 3/1987 | Japan . |
| 62-60378 | 3/1987 | Japan . |
| 08214282A | 8/1996 | Japan . |
| 8-275077 | 10/1996 | Japan . |

OTHER PUBLICATIONS

EPO Search Report, Feb. 19, 1999.
Hartmvt Witting, Carsten Griwodz, Intellegient Media Agent in Interactive Televison Systems, IBM European Networking Center, IEEE, 1995, pp. 182–189.
Japanese Official Action dated Oct. 16, 1998 (Translation).
Harigai et al.; "LSI Chip Set for Closed Captioned Decoder System;" *IEEE Transactions on Consumer Electronics*; vol. 37; No. 3; pp. 449–454 (Aug 1991).
Moller et al.; "A Single Chip Solution for Closed–Captioning Decoding;" *IEEE Transactions on Consumer Electronics*; vol. 38; No. 3; pp. 274–278 (Aug. 1992).
O'Malley; "Text–to–Speech Converison Technology;" *Computer*; vol. 23; No. 8; pp. 17–23 (Aug. 1990).

*Primary Examiner*—Chris Grant
*Attorney, Agent, or Firm*—Ratner & Prestia

[57] ABSTRACT

A method and apparatus for requesting, receiving, processing, and providing information from a single source to a television viewer. An information provider is accessed via a communications link and specific data, which is separate and distinct from video signals received by the television receiver, is downloaded to the television receiver. The data provided by the information provider is database information with minimal formatting and does not contain any graphical overhead. Requests for information from the information provider may be on demand or at a predetermined time. The information provided may be filtered by the information provider and/or television receiver based on selected program categories and/or a user provided profile.

19 Claims, 5 Drawing Sheets

FIG. I

METHOD AND APPARATUS FOR PROVIDING ELECTRONIC PROGRAM GUIDE INFORMATION FROM A SINGLE ELECTRONIC PROGRAM GUIDE SERVER

FIELD OF THE INVENTION

The present invention generally relates to receiving information from a single service provider and, more particularly, it relates to obtaining an Electronic Program Guide (EPG) containing TV schedule information for substantially all terrestrial broadcast TV stations, substantially all cable TV companies, substantially all satellite TV delivery services, substantially all telco TV delivery services and substantially all other types of available TV service to the home from a dedicated Electronic Program Guide Server (EPGS) and providing this information to a viewer.

BACKGROUND OF THE INVENTION

Currently, television receivers in North American homes are able to obtain Electronic Program Guide (EPG) data through the Vertical Blanking Interval (VBI) of NTSC signals. These are carried on a specific terrestrial channel (typically a local Public Broadcast Service (PBS) station) or on a specific cable TV station. Starsight Telecast™ is one provider of a VBI EPG service and typically charges a fee of $6 per month.

The television receiver includes special hardware and software designed or licensed by Starsight to the various television manufacturers. The format of the transmission is proprietary as is the hardware and software used in the television receiver to decode and display the information. The data rate of the data transmission is 960 bps. The EPG data signal contains information for every cable system and terrestrial TV station in the area covered by the PBS station resulting in a great portion of the received data being of no use to the viewer. This system has a drawback in that, given the slow communications speed and the amount of data sent, it may take as long as 12–24 hours for a particular user to obtain a complete data set.

Acquisition of the EPG data is accomplished only if the television receiver is tuned to the specific channel that carries the transmission. Typically, this requires the television receiver be tuned to the provider channel (i.e. PBS) while the television is not in use, such as overnight.

Another system for providing EPG data through the VBI is planned by Gemstar. However, these broadcasts will be provided by the networks such as ABC, NBC, CBS and their affiliates. This system has the drawback that the networks will only provide their own respective programming information. Therefore, the viewer will be required to select each and every channel over a period of time in order to build up a collection of schedules for all of the television stations of interest.

Other service providers, such as DirecTV™, Primestar™ and Echostar™, also provide EPGs through special transport packets in the digital data stream of the signal. This same approach will be used by Digital Cable and Wireless Cable services (MMDS).

With the increased popularity of PCs and the advent of the Internet, certain companies now provide EPGs over the Internet. These EPGs are accessible by computers and the information is displayed on the computer display monitor. Information provided by these services include the program schedules for the major terrestrial stations as well as cable networks.

The data presented by the Internet services are described in graphical form, such as HTML. The PC simply displays the EPG in the way it was sent from the Web Site. This system has a drawback in that the graphical format adds excessive overhead and the attendant throughput problems associated with such large blocks of data. The intelligence for responding to subscriber requests for day/date specific TV schedules, the graphical form in which it is displayed, the sorting abilities, etc. are under the control of the Web Server.

Another conventional system, as disclosed in U.S. Pat. No. 5,121,476 to Yee, provides information to a viewer via a television receiver display. In this conventional method the digital data is superimposed on the analog video signal at the video signal source. When the video signal is received by the television receiver, the digital data, which appears as low-level noise in the received image, is extracted and stored in a memory for selective access and display of the data. In this conventional method, the decoder may be internal or external to the television receiver.

In another conventional system, information is provided to the viewer by obtaining data via a link. Such a system is described in U.S. Pat. No. 4,751,578 to Reiter et al. In this system the video signal from the antenna or cable TV source is received and demodulated. The data is then converted into video data and mixed with the demodulated video signal received from the antenna or cable TV input. Finally, the combination of video data and demodulated video signal is re-modulated and sent to the input of the television receiver for further processing and display to the viewer.

SUMMARY OF THE INVENTION

The present invention overcomes the above mentioned disadvantages by providing a method and apparatus for requesting, receiving, processing, and providing information containing substantially all of the television information for a region from a dedicated EPG server to a television viewer. First, a television receiver requests the information by accessing a local information provider via a communications link. The specific requested information is downloaded by the server to the television receiver via the communications link and is separate and distinct from video information received by the television receiver. The information provided by the server is minimally formatted and does not contain any graphical information. The received information is processed, formatted, and provided to the viewer for display on the television receiver screen.

According to another aspect of the present invention, the selection of displayed information is made by the television receiver.

According to another aspect of the present invention, the selection of displayed information is made by the EPGS.

According to another aspect of the present invention, the communications link is a telephone.

According to another aspect of the present invention, the communications link is a cable television line.

According to another aspect of the present invention, the EPG is aurally provided to the viewer via an audio system.

According to another aspect of the present invention, a memory is used to store the processed information for later retrieval and display or annunciation to the viewer.

According to another aspect of the present invention, the EPGS information is requested at a predetermined time based on either subscriber information or a randomly assigned time determined by the EPGS at initial subscription.

According to another aspect of the present invention, the information is decoded and displayed by using the closed caption device contained within the television receiver.

According to a further aspect of the present invention, the information is displayed in the foreground of the video image or superimposed on the video image.

According to another aspect of the present invention, the request for information includes a viewer profile created at the time of viewer subscription and subsequently updated as needed.

According to another aspect of the present invention, the viewer profile includes viewer programming preferences, viewer address, and viewer telephone area code and exchange information.

According to another aspect of the present invention, the EPGS uses the telephone exchange and area code of the viewer in order to determine the channels that are available to the viewer, through cable television services for example, as well as channel assignments.

According to another aspect of the present invention, the request for information is made using predetermined menu selections by the viewer.

According to another aspect of the present invention, the menus are created by the EPGS based on the viewer profile.

According to another aspect of the present invention, the menus are created by the television receiver.

According to another aspect of the present invention, the menus are customized by the viewer.

According to another aspect of the present invention, the television receiver provides additional service information to the EPGS, such as direct satellite broadcast systems, telephone subscription services, etc., to which the user is linked.

According to another aspect of the present invention, the viewer requests information for a specified period of time.

According to another aspect of the present invention, the information provided to the viewer contains program ratings, summaries, and capsule reviews.

According to another aspect of the present invention, the information provided by the EPGS contains time data for updating or resetting the internal clock of the television receiver.

BRIEF DESCRIPTION OF THE DRAWINGS

The invention is best understood from the following detailed description when read in connection with the accompanying drawings, in which.

DETAILED DESCRIPTION

The present invention provides for requesting, receiving, processing and displaying Electronic Program Guide (EPG) information to a television viewer. The present invention requests program information from an Electronic Program Guide Service (EPGS), receives the requested information, and processes and displays the information to the viewer. The information obtained includes substantially all of the TV related information of interest to the viewer. This information is based on the entire country, a region such as the North East or South West, a Tri-state area, or a collection of cities in an area determined by the viewer's location. Examples of such information are terrestrial broadcast TV schedules, satellite service TV schedules, cable company TV schedules, telco delivery service TV schedules, as well as program ratings, summaries, capsule reviews, and the like.

Figure 1:
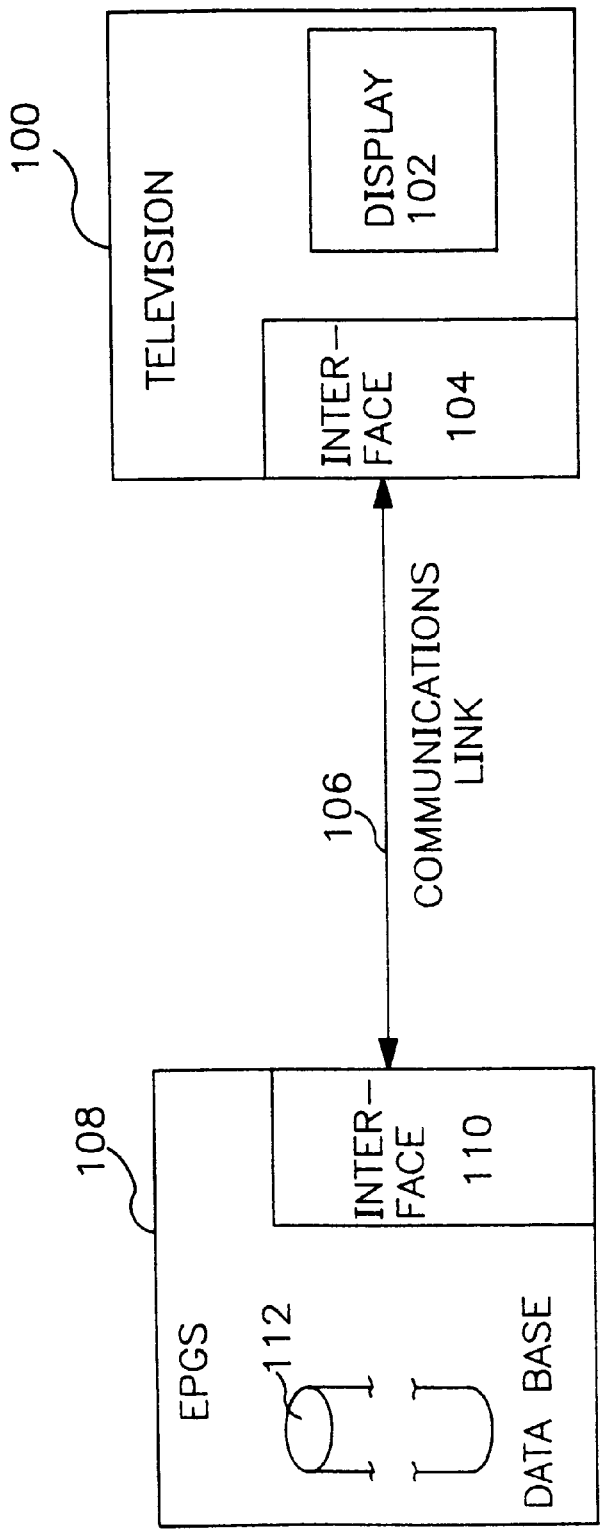
FIG. 1 is a high level functional block diagram of an exemplary embodiment of the present invention.

FIG. 1 is a high level block diagram of the present invention. Television receiver 100 requests EPG information from EPGS 108 through television receiver interface 104 connected to EPGS interface 110 via communications link 106. The requested information is obtained from EPGS database 112 and transmitted from EPGS 108 through EPGS interface 110 over communications link 106 to television receiver interface 104 within television receiver 100. The information is then processed and displayed to the viewer on display 102.

It should be noted that the communication link may be for example, a telephone link or a cable system service link. The communication link is not limited to these examples, however. In the exemplary telephone link, an interface including a modem with a communication speed of 28.8 kpbs, for example, may be used. This data rate is significantly higher than the data rate of convention vertical blanking interval (VBI) based systems. The exemplary user interface initiates communication with the server and controls the communications process.

The request for EPGS information may be made on demand by the viewer or at a predetermined time. The predetermined time may be selected by EPGS 108, for example, when a subscriber initially sets up the service, in order to avoid communication delays, and stored in a Non-Volatile Memory (NVM) (not shown) within television receiver 100. This predetermined time is typically during late evening or early morning hours when communication traffic is reduced, although any time of day may be used. In the event that television receiver 100 loses track of time, for example, due too a loss of power for an extended time, EPGS 108 may update the clock (not shown) contained in television receiver 100 when the data from the next data request is received, or television receiver 100 may attempt to connect to EPGS 108 automatically at power-up whenever standby power has been lost.

Figure 2:
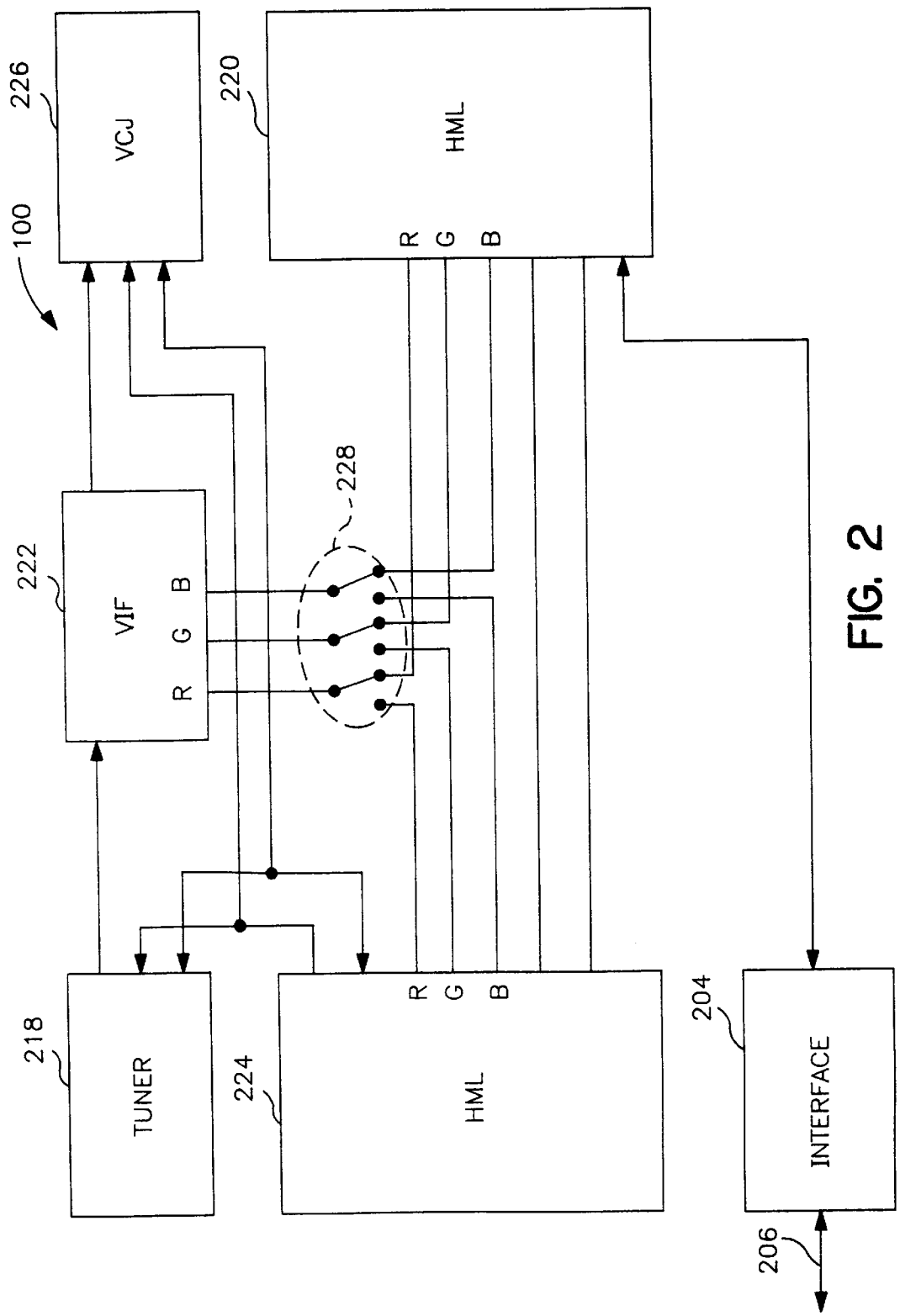
FIG. 2 is a block diagram of a first exemplary embodiment of the present invention.

FIG. 2 shows exemplary signal flow and control within television receiver 100. Processor 220 initiates and controls interface 204 to request information from EPGS 108 over communications link 206. When EPGS 108 responds with the requested data, interface 204 sends the data to processor 220. Processor 220, which, in this example, is part of the Closed Caption circuit (not shown), decodes and formats the data into RGB data for display. A/V switching circuit 228 is switched to connect the RGB data containing the formatted EPG data to the Video IF (VIF) 222. VIF 222 combines the received information in RGB format, as provided by the closed caption circuit, with the video RGB received from tuner 218 and forwards this combined video to Video Control Jungle (VCJ) logic circuitry 226 for display on the television receiver screen. VCJ logic circuitry 226 controls the timing of the insertion of the generated text into the active video. Processor 220 may also contain or be connected to a memory (not shown) which holds the formatted data for display on the television receiver screen. The use of a memory allows the information to be downloaded and stored as encoded data for future use instead of being displayed as it is received. Processor 224 also controls the display of the on-screen control functions of the television receiver, such as volume level, channel number, color, tint, brightness, contrast, etc.

Processor 224 controls the display of the decoded information on the television receiver display. The information may be displayed, for example, superimposed on the video image data or independent of any video image data. The information may be shown on one or several lines at a time and may scroll vertically or horizontally if desired. The information may be placed in an area selected by the viewer, for example, such as at the bottom of the display. The color of the displayed information may be selected from a predetermined pallet of colors by the viewer. However, if desired, any one or combinations of these features may be eliminated, in order to simplify the system and minimize cost. Additionally, the display size of the information may, for example, be reduced or enlarged from the predetermined display size.

Figure 3:
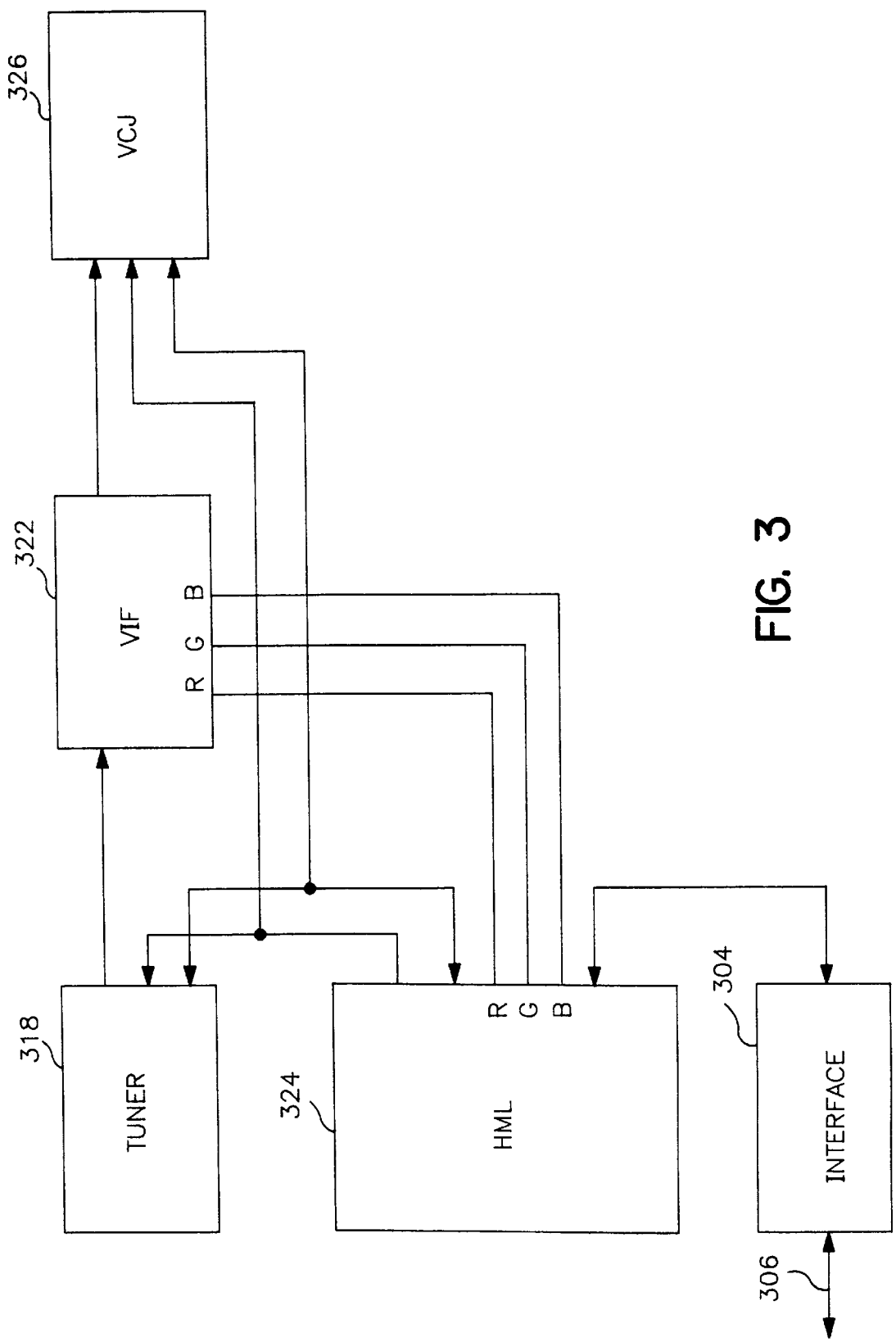
FIG. 3 is a block diagram of a second exemplary embodiment of the present invention.

FIG. 3 shows the signal flow of another exemplary embodiment of the present invention. In this example, interface 304, communications link 306, tuner 318, VIF 322, and VCJ 326 correspond to elements 204, 206, 218, 222, and 226, respectively, as shown in FIG. 2 and are not described further. Processor 324 controls, processes, and formats the EPG data transfer using the circuitry which produces the on-screen display. This simplified version requires very little hardware and is very cost effective. Processor 324 may include or be connected to a memory (not shown), as explained above, to allow for storage and retrieval of EPG data for later display.

The EPGS database 112 contains substantially all television information for the nation, region or state. A region may be a specific section of the country such as the Northeast or Southwest, a tri-state area or a collection of cities in an area, for example. The database may also contain, in addition to programming information, program ratings, summaries and capsule reviews, for example.

The EPGS may be subscribed to on a monthly basis, such as how one subscribes to a cable service, or based on usage, such as by the minute with a minimum connection fee similar to a 1-900 service, for example.

The viewer may desire the entire information database or only a portion thereof. For example, the viewer may be able to preselect specific information of interest by using a menu system as shown in Tables 1A and 1B. The user determines what is of particular interest on the main menu as shown in Table 1A. The viewer is then presented with a submenu, such as shown in Table 1B, for example.

TABLE 1A

MENU SELECTIONS

ANTENNA

| CABLE SERVICE 1 | CABLE SERVICE 2 |
|---|---|
| SATELLITE SERVICE 1 | SATELLITE SERVICE 2 |
| TELCO SERVICE 1 | TELCO SERVICE 2 |

TABLE 1B

SATELLITE/CABLE/TELCO SUBMENU

| ALL TITLES | COMEDIES | DRAMA | SCI-FI |
|---|---|---|---|
| CHILDREN | MATURE | | |
| PROGRAM SUMMARY | | CAPSULE REVIEW | |
| TIME RANGE ____ TO ____. | | | |
| DATE RANGE ____ TO ____. | | | |
| TODAY ONLY | | | |

This subset of information is then requested by the television receiver and subsequently received, processed and displayed to the viewer. The viewer is then able to more quickly view this subset of information and there is efficient use of the available data bandwidth. The menu system, for example, may be predetermined in the manufacture of the television receiver or may be provided by the EPGS.

The viewer may also limit the amount of data obtained from the EPGS by using the scan list contained in the television receiver as a filter. In this way the EPGS provides filtered information from the database to the viewer. This reduces the transmission time and increases the data throughput.

The scan list is typically constructed by the television receiver during initial setup by the viewer. Upon command from the viewer, the television receiver searches for all available television stations. When a station having a viewable signal is found the channel number of that station is added to the scan list. The television receiver repeats this procedure until the entire band available to the television receiver is scanned. The user also has the ability to delete channels from the scan list, such as those which are watched infrequently, as another way to minimize the amount of data received from the EPGS. The EPGS is able to configure the information based on the scan list since the EPGS is able to determine which cable company services the viewer subscribes to by virtue of the viewer profile and the viewer's telephone area code and exchange.

The amount of data obtained from the EPGS may be further limited by means of a viewer profile provided to the EPGS during user subscription initialization. The user profile may include, for example, services to which the user subscribes, such as satellite services, telco services, etc., as well as the TV channel scan list described above. In addition, the viewer profile may contain the viewer's address, area code and telephone exchange, as well as program preferences. The program preferences may delete any particular form of programming, such as all sports programming or programs rated R or TV M for example, and include any form of programming, such as classical music programs. The viewer profile may be subsequently updated as desired by the user.

The information from the EPGS is provided with minimal formatting, or as a text string of fixed length, and is not laden with any graphical information. This allows for hardware simplicity and very low cost. Table 2A is an exemplary implementation of a text string of fixed length sent from the EPGS.

TABLE 2A

| HEADER | PROVIDER | CHANNEL | STATION | START | TITLE | RATING | DURATION |
|---|---|---|---|---|---|---|---|

HEADER - TYPE OP DATA
    00      Time of Day/MMDDYY
    01      Program data
PROVIDER
    ANT;      DirTV;      USSB;      CABLE 1;      TELCO 2;      etc.
CHANNEL: 1–999
STATION - 4 Alphanumeric Characters
START - Half hour increments - 00–47
    00 - Midnight;      01 - 12:30 AM;      02 - 1 AM; . . . 47 - 11:30 PM
TITLE - 30 Alpha numeric Characters
RATING - TV G;      TV PG;      TV M;      etc.
DURATION - 5 minute increments
    e.g. 20 = 1 hour Text string is made up of Header field, Service Provider field, Channel field, Station field, Start field, Title field, Rating field, and a Duration field. In this example, the duration field indicates five minute increments, although other implementations may be used which increase or decrease the precision of the duration field, such as 1 minute or 10 minute increments. The text string may also be implemented in a number of ways without departing from the invention. In this example, EPG information is for the current day. Additional implementations may add fields for date of program, summary, and capsule review.

Table 2B is an example of EPG information for a single program using the exemplary implementation of Table 2A.

TABLE 2B

| 01 | USSB | 012 | TBS_ | 38 | STAR WARS | TV G | 55 |
|---|---|---|---|---|---|---|---|

Channel information for USSB service TBS station on channel 12 with a start time of 7PM for STAR WARS which is rated TV G and lasts for 2 hours and 45 minutes.

In addition, the data from the EPGS may contain additional information which may be used by the television receiver to format the data prior to display so as to provide the viewer with more than program title and time information.

The information may be displayed in a variety of ways. In order to reduce hardware and keep costs low, the closed caption circuitry contained within the television receiver may be used to decode and display the information to the viewer. In this case, the information may be displayed according to the closed caption hardware. Examples of closed caption decoder hardware are discussed in an article by M. Harigai et al. entitled "LSI Chip Set for Closed Caption Decoder System", *IEEE Transactions on Consumer Electronics,* vol. 37, no. 3 pp. 449–454 (August 1991), and in a paper by U. Moller et al. entitled "A Single Chip Solution for Closed-Caption Decoding", *IEEE Transactions on Consumer Electronics,* vol. 38, no. 3, pp. 274–278 (August 1992). However, the present invention is not limited in this sense and may also employ addition enhancements for high end, high performance television receivers to improve graphical resolution of the displayed information.

Additional circuitry may be added to provide the viewer with various options as the display of the information provided by the closed caption decoder. For example, the user may wish to superimpose the information on the video display without occluding a portion of the display, such as that which occurs in a closed caption display. Furthermore the viewer may wish to adjust the rate at which the information is presented. If so desired, the viewer may display the data on a blank screen (without a video image) in various formats, such as 20 rows of 40 characters each. This display format may be fixed in order to simplify hardware and reduce cost or, in higher end television receivers, may be varied by the viewer if desired.

Table 3A is an example of how the EPG may be displayed on the television receiver screen. The display may indicate the service provider, channel designation, station name, start time, title, duration, and current time of day. The display may also allow the viewer to select a program directly from the display for viewing as shown by the asterisk in line 3 of table 3A. This selection may also be accomplished by highlighting the desired program on the display or by any other means. The title may be abbreviated or truncated in order to meet a fixed field requirement. The fields may be color coded on the screen with a background color and/or a foreground color for ease of viewer differentiation. These color fields may be predetermined or viewer selectable.

TABLE 3A

| SEL | SERV | CH | STATION | TIME | TITLE | RATING | 6:55 PM<br>LENGTH |
|---|---|---|---|---|---|---|---|
|  | CAB1 | 2 | CBS | 7 PM | MURDER SHE WROTE | TV G | 1:00 |
| * | ANT | 3 | NBC | 7 PM | NATIONAL NEWS | NR | :30 |
|  | USSB | 4 | HBO | 7 PM | FREE WILLY 2 | TV G | 1:50 |

Tables 3B and 3C show examples of an abbreviated title and a title truncated to 10 characters, respectively. In addition, the rating of the program is abbreviated such that an unrated program (TV NR) will not contain rating information and all other rating will eliminate the TV prefix (TV G will become G). As mentioned above, the title is formatted at the EPGS source but may also be formatted by the television receiver if desired.

TABLE 3B

| SEL | SERV | CH | STATION | TIME | TITLE | RATING | 6:55 PM LENGTH |
|---|---|---|---|---|---|---|---|
|  | CAB1 | 2 | CBS | 7 PM | MURDR SHE WROT | G | 1:00 |
| * | ANT | 3 | NBC | 7 PM | NAT NEWS |  | :30 |
|  | USSB | 4 | HBO | 7 PM | FREE WLY 2 | G | 1:50 |

TABLE 3C

| SEL | SERV | CH | STATION | TIME | TITLE | RATING | 6:55 PM LENGTH |
|---|---|---|---|---|---|---|---|
|  | CAB1 | 2 | CBS | 7 PM | MURDER SHE | G | 1:00 |
| * | ANT | 3 | NBC | 7 PM | NATIONAL N |  | :30 |
|  | USSB | 4 | HBO | 7 PM | FREE WILLY | G | 1:50 |

Figure 4:
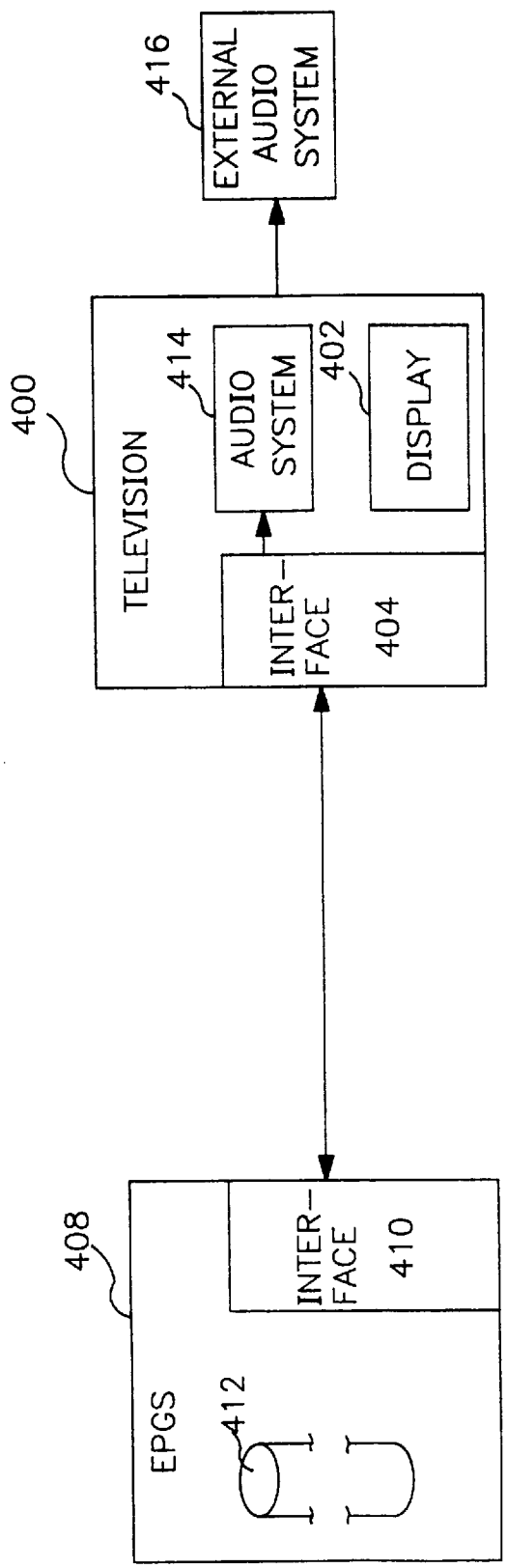
FIG. 4 is a high level functional block diagram of another exemplary embodiment of the present invention.

Although the invention as described above is directed to display of EPG information on a television receiver, the invention is not limited to that embodiment. Referring to FIG. 4, a second exemplary embodiment of the present invention is explained. In this exemplary embodiment, the EPG information may be aurally presented to the viewer. In this way the viewer may concentrate on the video display while listening to the EPG. This mode of transmission may be of particular interest to sports enthusiasts who are more interested in the video portion of a sporting event and desire a quick way of reviewing upcoming programs without looking away from the game.

In this embodiment, the audio presentation may be provided by the internal audio system 414 of the television receiver or through an external audio system 416. The retrieved EPG information, as in the first embodiment, may be predefined by the user via a menu system. Furthermore, the EPG audio 416 may be mixed with the audio signal of the video display or may replace the audio portion of the video program. When information is presented aurally, program titles need not be abbreviated. Field format may be preserved by having field name spoken before field contents.

Figure 5:
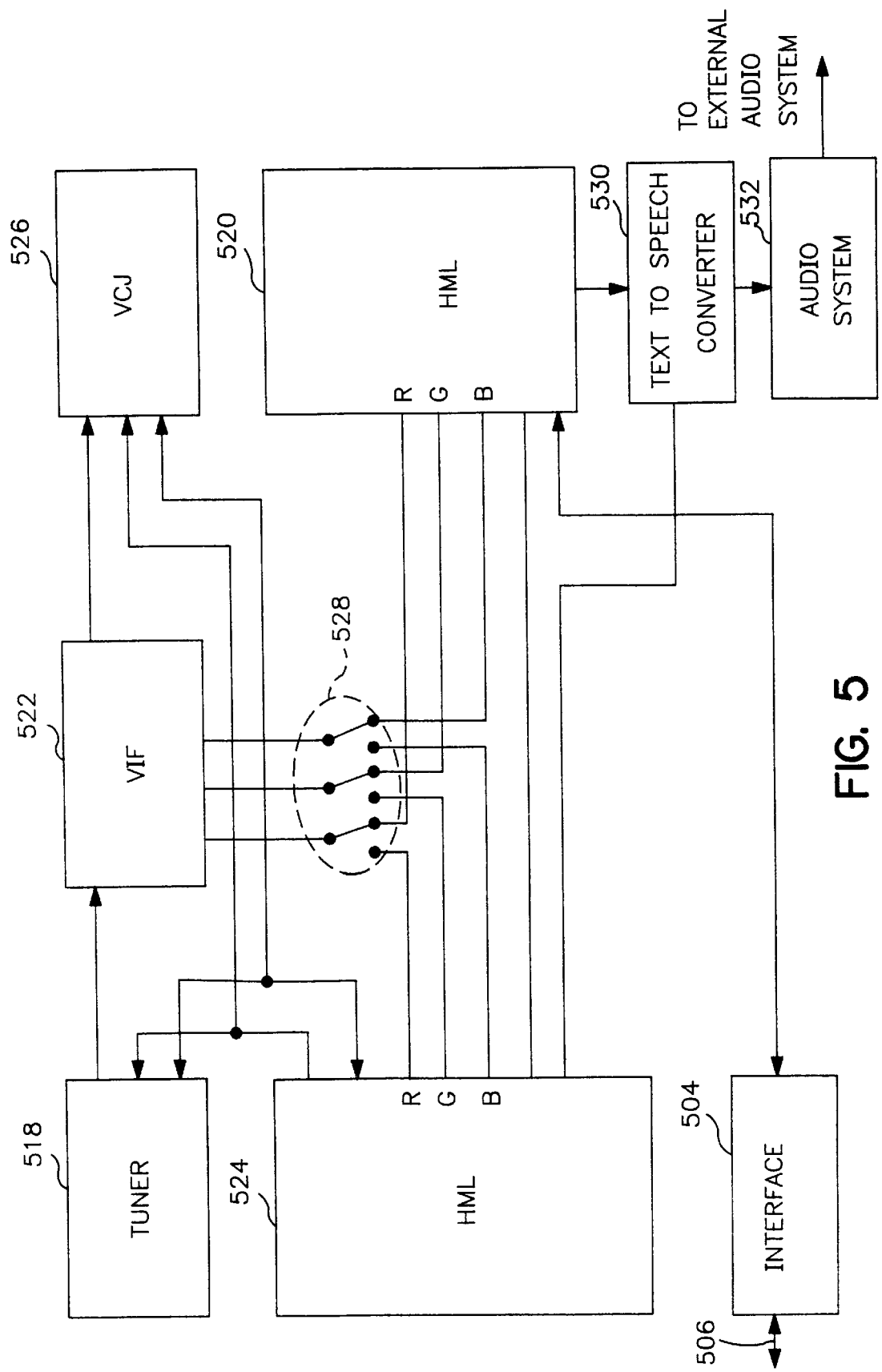
FIG. 5 is a block diagram of the exemplary embodiment of FIG. 4.

FIG. 5 shows the signal flow and control within the television receiver for this exemplary embodiment. In this figure, elements 504, 506, 518, 520, 522, 524, 526, and 528 perform at least the identical functions of elements 204, 206, 218, 220, 222, 224, 226, and 228, respectively, of FIG. 2. In addition, processor 524 controls text to audio converter 530 (converter). Converter 530 may, for example, be implemented in hardware, software or a combination of hardware and software. Converter 530 receives text data from processor 520 and, under control of processor 524, converts this text into audio information. This audio information is provided to audio system 532 and/or to external audio system 416 (shown in FIG. 4). The audio information may be presented to the viewer in lieu of, or as an enhancement to, the visual presentation of the EPGS. Additional information on the preprocessing of text prior to conversion to speech can be found in O'Malley, "Text-to-Speech Conversion Technology", Computer, Vol. 23, No. 8, August 1990, pp. 17–23, which is incorporated herein by reference.

Although the invention is illustrated and described herein, the invention is not intended to be limited to the details shown. Rather, various modifications may be made in the details within the scope and range of equivalents of the claims and without departing from the spirit of the invention.

The invention claimed is:

1. Apparatus to provide a subscriber with Electronic Program Guide (EPG) information on a television receiver having an on-screen display device which is used to display control functions of the television receiver, the apparatus being for use with an Electronic Program Guide Server (EPGS), the apparatus comprising:

a bi-directional communication link interconnecting the television receiver and the EPGS, a database included in the EPGS containing at least one of:
  a) TV schedule information for substantially all terrestrial broadcast TV stations in a predetermined area,
  b) TV schedule information for substantially all cable companies in the predetermined area,
  c) TV schedule information for substantially all satellite TV delivery services in the predetermined area,
  d) TV schedule information for substantially all telco TV delivery services in the predetermined area, and
  e) TV schedule information for substantially all other kinds of available TV service to the home in the predetermined area, selection means for selecting data from the database of the EPGS for presentation to the subscriber, requesting means in the television receiver for requesting data over the bi-directional communication link, receiving means in the television receiver for receiving the requested data over the bi-directional communication link, the requested data being separate from a video input signal received by the television receiver, and processing means for processing the data from said receiving means into data formatted for display using the on-screen display device of the television receiver, and for providing the formatted data to the on-screen display device.

2. An apparatus according to claim 1, wherein the database contains data based on at least one of:
  a) a nationwide,
  b) a regional, and
  c) a statewide
data.

3. An apparatus according to claim 1, further comprising:
memory means for storing the received data from said receiving means, wherein said processing means processes the data from said memory means into the formatted data.

4. An apparatus according to claim 1, wherein the data conforms to a closed-caption protocol and is decoded using a closed caption device contained in the television receiver.

5. An apparatus according to claim 1, wherein the formatted data is displayed in a foreground portion of a received video image.

6. An apparatus according to claim 1, wherein the received data is encoded with time information and title information.

7. An apparatus according to claim 1, wherein the received data further contains at least one of:
 a) a program rating,
 b) a program summary, and
 c) a capsule review
 of a respective program.

8. An apparatus according to claim 1, wherein said selection means is contained in the television receiver and the data selected is a subset of the data in the database and the selection is based upon at least one of:
 a) a predetermined menu generated by the television receiver,
 b) a scan list generated by the television receiver,
 c) a time frame, and
 d) a program type.

9. An apparatus according to claim 1, wherein the received data includes time data for updating an internal clock of the television receiver.

10. An apparatus according to claim 1, wherein a user profile is provided to the EPGS by the television receiver, the user profile including at least one of:
 a) subscriber address,
 b) telephone exchange information,
 c) area code information,
 d) a satellite TV service provider to which the user subscribes,
 e) a local telco delivery service to which the user subscribes, and
 e) other types of enrollment information.

11. An apparatus according to claim 10, wherein the user profile is created when the user initially subscribes to the EPGS.

12. An apparatus according to claim 10, wherein the selection means is contained in the EPGS and selects the data based on the user profile.

13. An apparatus according to claim 10, wherein:
 said selection means consists of an EPGS selection means and a television receiver selection means,
 said EPGS selection means selects the data based on the user profile, and
 said television receiver selection means further selects data based upon at least one of:
 a) a predetermined menu generated by the television receiver,
 b) a scan list generated by the television receiver,
 c) a time frame, and
 d) a program type.

14. An apparatus according to claim 1, wherein
 a) the communications link is a telephone connection,
 b) the EPGS uses telephone exchange information of the subscriber to determine available television stations, and
 c) the telephone exchange information is extracted from the telephone connection.

15. An apparatus according to claim 1, wherein the bi-directional communication link is one of a telephone line and a cable television line.

16. An apparatus according to claim 1 wherein:
 the processing means processes the data received by the receiving means into text data and the apparatus further comprises:
 conversion means for converting the formatted text data from said processing means into audio information, and
 audio means for providing the audio information to a speaker system of the television receiver.

17. An apparatus according to claim 16, wherein said audio information is substituted for an audio signal of a respective video input signal.

18. An apparatus according to claim 16, wherein said audio information is blended with an audio signal of a respective video input signal.

19. A method for providing Electronic Program Guide (EPG) information from an Electronic Program Guide Server (EPGS) to a television receiver with an on-screen display device which is used to display control functions of the television receiver, the method comprising the steps of:
 a) connecting the television receiver and the EPGS with a bi-directional communications link,
 b) requesting data from the EPGS over the bi-directional communications link,
 c) receiving the data of step a) into the television receiver over the bi-directional communications link,
 d) storing the received data of step b) into a memory,
 e) processing the data stored in step d) into data formatted for display on the on-screen display device, and
 f) providing the formatted data to the television receiver on-screen display device.

* * * * *

UNITED STATES PATENT AND TRADE MARK OFFICE
CERTIFICATE OF CORRECTION

PATENT NO. : 6,020,880
DATED : February 1, 2000
INVENTOR(S) : Naimpally

It is certified that error appears in the above-identified patent and that said Letters Patent is hereby corrected as shown below:

On the Title Page.Item [56] References Cited, Other Publications, "Hartmvt" should read —Hartmut—.

On the cover page, Item [56] References Cited, U.S. Patent Documents, "4,989,174" should be –4,984,174–.

Signed and Sealed this

Twenty-seventh Day of March, 2001

*Attest:*

NICHOLAS P. GODICI

*Attesting Officer*   Acting Director of the United States Patent and Trademark Office